United States Patent [19]

Oshikoshi

[11] Patent Number: 4,769,694
[45] Date of Patent: Sep. 6, 1988

[54] METHOD OF PRINTING A COMPOSITE IMAGE OF HUMAN FIGURE AND PERSONAL DATA USING CRT

[75] Inventor: Yuji Oshikoshi, Tokyo, Japan

[73] Assignee: Fuji Photo Film Co., Ltd., Kanagawa, Japan

[21] Appl. No.: 900,622

[22] Filed: Aug. 26, 1986

[30] Foreign Application Priority Data

| Aug. 26, 1985 | [JP] | Japan | 60-185795 |
| Sep. 17, 1985 | [JP] | Japan | 60-203535 |
| Sep. 17, 1985 | [JP] | Japan | 60-203536 |

[51] Int. Cl.$^4$ ............ H04N 1/387; G03B 17/24
[52] U.S. Cl. ................... 358/75; 354/109; 354/76; 358/909
[58] Field of Search ............ 358/75, 76, 77, 78, 358/79, 909, 102; 382/2; 354/105, 110, 111, 120, 75, 76, 107, 108, 109; 313/467

[56] References Cited

U.S. PATENT DOCUMENTS

| 3,819,264 | 6/1974 | Voorhees | 355/43 |
| 4,139,292 | 2/1979 | Chiesa | 354/109 |
| 4,154,526 | 5/1979 | Kostiner | 354/107 |
| 4,163,256 | 7/1979 | Adcock | 358/909 |
| 4,304,471 | 12/1981 | Jones | 354/108 |
| 4,339,769 | 7/1982 | Fujita et al. | 358/244 |
| 4,438,453 | 3/1984 | Alston | 358/75 |
| 4,496,989 | 1/1985 | Hirosawa | 358/75 |
| 4,655,570 | 4/1985 | Jaffe | 354/107 |
| 4,660,098 | 4/1987 | Wolcott | 358/75 |

FOREIGN PATENT DOCUMENTS

| 53-33141 | 3/1978 | Japan | 358/75 |
| 5689187 | 7/1981 | Japan | 358/75 |
| 2074413 | 10/1981 | United Kingdom | 358/332 |

OTHER PUBLICATIONS

"Software Adds Photo Images to Databases", by Scott Mace, *Infoworld*, Jun. 23, 1986, p. 17.

Primary Examiner—James J. Groody
Assistant Examiner—Robert M. Bauer
Attorney, Agent, or Firm—Young & Thompson

[57] ABSTRACT

A method of making a print of a composite image which includes at least a figure image and an image of letters, comprises the steps of providing the composite image, displaying the same on a CRT display device, and exposing a printing paper to the displayed composite image. For providing the composite image, the figure image is formed by a still camera on a photosensitive material which can be preserved semipermanently. When making the print, the image is picked up from the photosensitive material by an image signal forming device such as a TV camera so as to be composed with the image of the letters.

4 Claims, 8 Drawing Sheets

SPECTRAL LUMINANCE CHARACTERISTIC OF CRT WHEREIN P45 FLUORESCENT SUBSTANCE IS USED AT 22.5KV

SPECTRAL SENSITIVITY OF COLOR PRINTING PAPER

SPECTRAL LUMINANCE CHARACTERISTIC OF CRT WHEREIN P22 FLUORESCENT SUBSTANCE IS USED

SPECTRAL LUMINANCE CHARACTERISTIC OF CRT WHEREIN A MIXTURE OF P45 AND P22 IS USED

P45:P22=1:4

METHOD OF PRINTING A COMPOSITE IMAGE OF HUMAN FIGURE AND PERSONAL DATA USING CRT

BACKGROUND OF THE INVENTION

The present invention relates to a method of making a print of a composite image comprising a human figure and personal data which are displayed on a CRT display device.

In recent years, there has been widespread use of various cards. Some of these cards that are essential to prove the holder's identity, for example identification cards such as company identification cards, driving licenses and so on, are provided with a picture of the face of the cardholder as well as personal data including the name, date of birth, etc. The conventional driver's license comprises a printed sheet sandwiched between polyester sheets. For making the printed sheet, a sheet of personal data typewritten thereon is set in a camera. Upon taking a picture of human figure, the images of the sheet and the human figure are formed on a reversal color photographic or printing paper simultaneously and compositely, but by different taking lenses.

When making a print of a composite image which includes a human figure and personal data, a TV camera and a computer are used to produce the composite image as electric signals which in turn are displayed as a visible image on a CRT for printing the composite image on printing paper. In this case, it is required to use a large commercial-type TV camera in order to produce and record with high quality the human image. Such a large commercial-type TV camera is bulky to carry about for taking figure images at different places and requires operators to be skilled.

OBJECTS OF THE INVENTION

Therefore, it is an object of the present invention to provide a method of making a print of a composite image on a CRT display device, which makes it easy not only to take a number of figure images but also to preserve these images.

It is another object of the present invention to provide a method of making a print of a composite image on a CRT display device, which makes it possible to provide a high quality image on printing paper even in a short time of exposure.

SUMMARY OF THE INVENTION

In accordance with the present invention, the CRT composite image printing method of the present invention comprises the steps of preparing a number of figure images on a photosensitive material such as a negative film, reading one of the figure images in the form of a video signal by an image reading device such as a TV camera, preparing personal data as video signals for describing the figure image to be read, providing composite video signals of the figure image and the personal data so as to display the composite video signals as a visible composite image on a CRT display device, and printing the composite image on printing paper, thereby providing a print of the composite image.

According to a feature of the present invention, a number of figure images can be taken on a strip of negative film by a still picture camera. The use of a still picture camera makes it not only possible but also easy to take figure images at any place. Furthermore, the use of photosensitive material can provide high quality figure images and convenient preservation of them.

As the photosensitive material, it is permissible to use photographic films such as negative films, positive films, etc., and prints made from the photographic film. Furthermore, the figure images may be prepared in color or in black-and-white. A TV camera, an image sensor and the like can be used as the image reading device.

BRIEF DESCRIPTION OF THE DRAWINGS

For a fuller understanding of how the above objects are achieved by the present invention, reference should be made to the following detailed description with accompanying drawings wherein.

DESCRIPTION OF THE INVENTION

Figure 1:
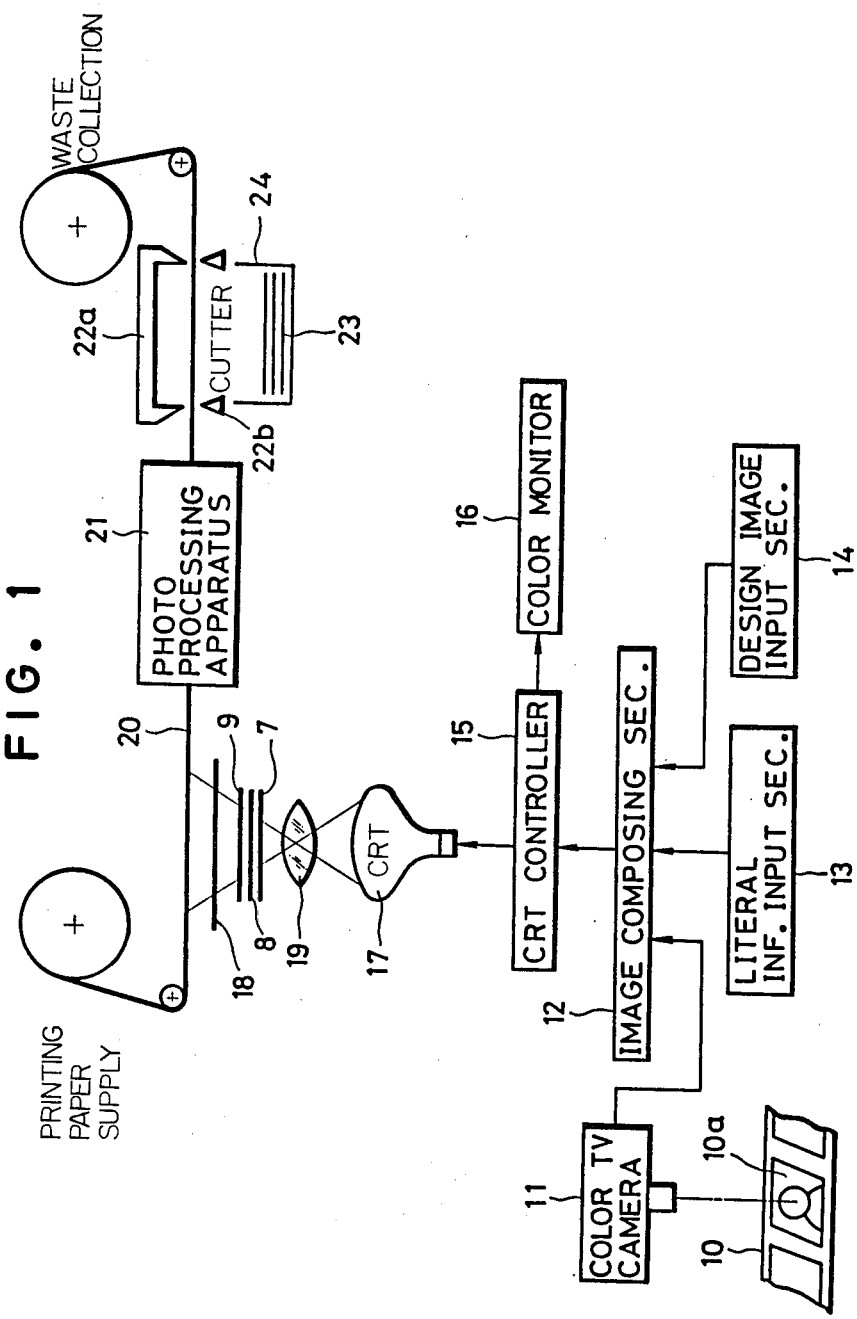
FIG. 1 is a diagram showing a CRT composite image printing apparatus which embodies the method of the present invention.

Referring now to FIG. 1 of the drawings, an apparatus for practicing the method of the present invention is shown. On a color negative film 10, there are a plurality of figure images 10a which are formed by a still camera and processed as usual. When making a print of a composite image, the color negative film 10, which is usually kept in the files, is placed on a stage (not shown) of the apparatus in order to pick up the figure images 10a by a color TV camera 11. The color TV camera 11 provides video signals of the figure image 10a which in turn are transmitted to an image composing section 12 comprising, for example, a computer.

A literal information input section 13 comprises a CRT display unit and a keyboard which are united as a console. An operator can enter literal information through the keyboard while viewing an image of that literal information displayed on the CRT display unit. The literal information includes personal data such as name, date of birth, employee number, etc. corresponding to the figure. That literal image is reversed as a negative and stored on a recording medium, for example a floppy disk. Because the floppy disk storing the personal data can reproduce the literal images at any time, the use of a floppy disk makes it easy to provide renewal cards.

A design image input section 14, which is, for example, a digitizer, is used to input a mark image in computer graphics, such as a company mark. That design image is reversed as a negative and stored on a floppy disk.

In the image composing section 12, the figure image produced by a color TV camera 11 is composed with the literal image and design image which are retrieved from the respective recording media. As will be described in detail later, the composing section 12 provides composite video signals which are transmitted to a CRT controller 15.

The CRT controller 15 is adapted to control the operations of a color monitor 16 and a black-and-white printing CRT 17 so as to display the composite video signals either as a positive composite image on the color monitor 16 before printing or as a negative composite image on the black-and-white printing CRT 17 upon printing.

After confirming the coincidence between the figure image and the literal image of the personal data on the color monitor 16, the operator actuates a key to start the printing operations of the apparatus. As a result, the controller 15 causes the printing CRT to display three monochromatic composite images, namely blue, green and red in sequence. Each composite image on the printing CRT 17 is focused on a color photographic or printing paper 20 through a lens 19 when a shutter 18 opens. Upon exposing the color printing paper 20, three color filters 7 to 9, namely blue (B), green (G) and red (R) are selectively inserted between the lens 19 and the shutter 18 so as to create a monochromatic composite image. In this way, the color printing paper 20 is exposed to three monochromatic composite images in a frame sequence exposure system.

The color printing paper 20 is then translated by one frame. At this time, the color negative film 10 is also translated by one frame and the same procedure is repeated. The color printing paper 20 with a number of composite images formed thereon is passed through a photo processing apparatus 21 well known in the art for developing, fixing and drying in this order.

The color printing paper 20 thus processed is cut off frame by frame by a cutter comprising a stationary blade 22a and movable blades 22b, providing print sheets 23 in a tray 24. On the other hand, the color printing paper 20 with the print sheets 23 cut off therefrom is rolled up as wastepaper.

Figure 2:
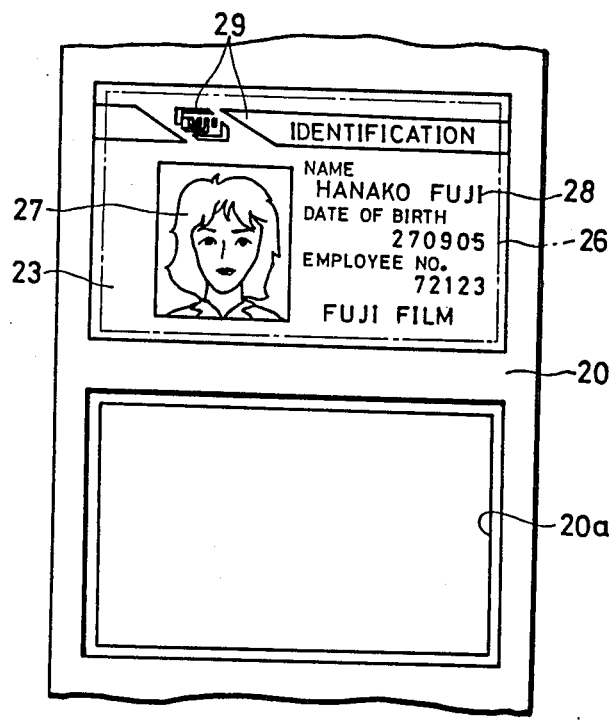
FIG. 2 is a view showing a printed paper with a print sheet punched out.

As shown in FIG. 2, on the color printing paper 20, there is printed a composite image comprising a figure image 27, a literal image of personal data 28 and a design image 29. The print sheet 23 is punched out along a line 26 from the printing paper 20. Numeral 20a denotes a punched-out opening.

Figure 3:
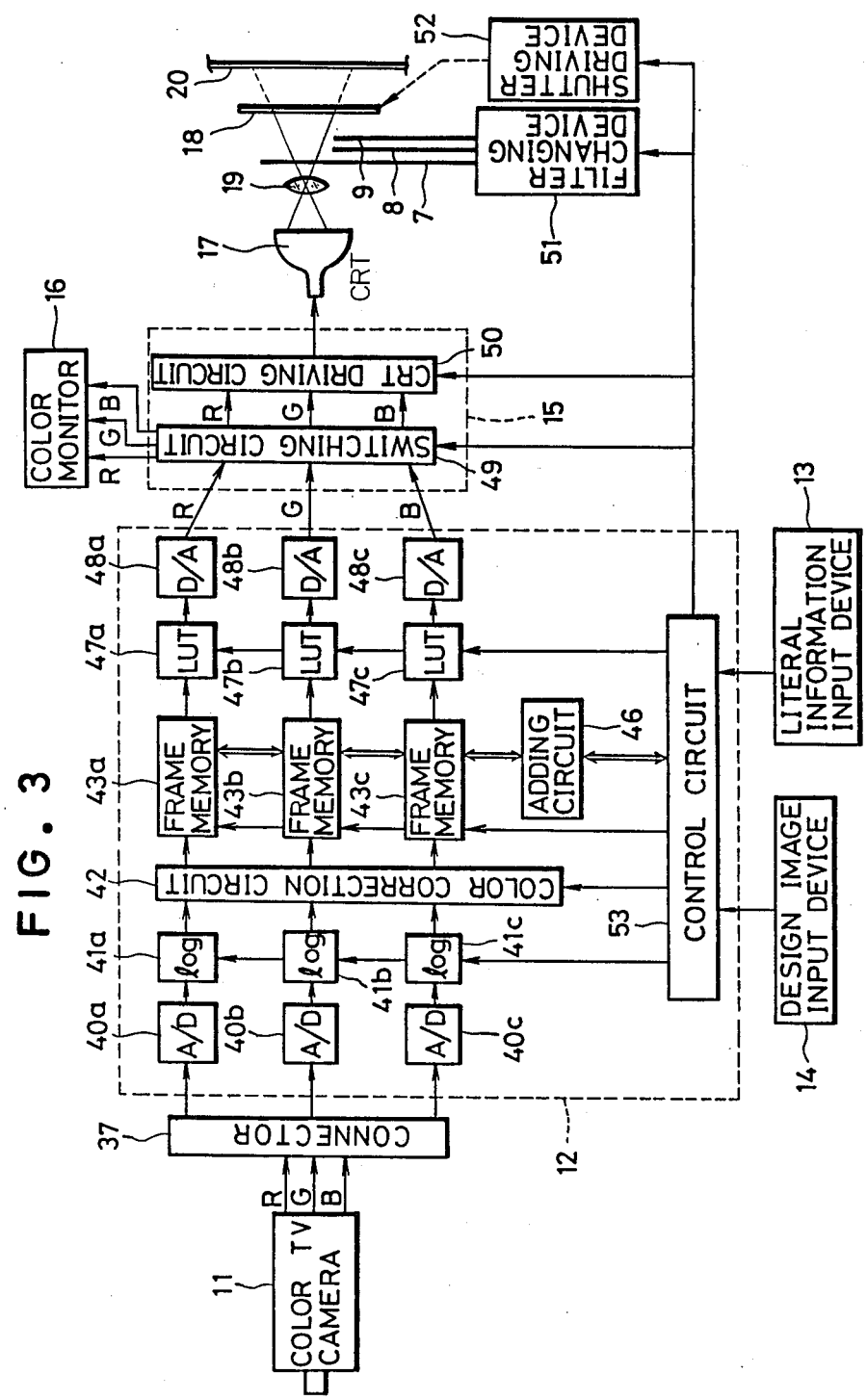
FIG. 3 is a block diagram showing an image composing section of FIG. 1.

A further understanding of practical operations of the image composing section 12 will be had from the following description referring to FIG. 3. The color TV camera 11 picks up the figure image 10a on the negative film 10 to provide information in the form of video signals in NTSC system to the image composing section 12 through a connector 37, after having separated into blue (B), green (G) and red (R) video signals. In the image composing section 12 there are three channels for processing the video signals by color.

The red image video signals (R) are converted into digital signals through A/D converter 40a and then transmitted to a logarithmic transforming circuit 41a to be transformed into density signals for respective picture elements. The density signals are subjected to corrections for the difference in spectral characteristics between the TV camera 11 and the color printing paper 20 and for the improper absorption of dye of the color printing paper 20 in a color correction circuit 42. In a frame memory 43a there are stored red density signals which are respectively the added values of density signals of the data image and the computer graphic image read out from the floppy disks. The red density signals in the frame memory 43a are read out and added to the density signals from the color correction circuit 42 in an adding circuit 46. The resulting red density signals are again stored in the frame memory 43a as composite image signals. The red composite image signals, after having been corrected in accordance with the gradient characteristics of the color printing paper 20 in a reference or look-up table (LUT) 47a, are converted by D/A converter 48a into analog signals which in turn are transmitted either to a color monitor 16 or to a CRT 17 through a switching circuit 49. Because the same sequential operations as for red are performed for green and blue, the description of the other composing circuits 40b and 48b and 40c to 48c is omitted.

The switching circuit 49 is adapted to transmit selectively three color composite image signals either to the color monitor 16 for editing a composite image on the screen of the color monitor 16 to the CRT 17 through a driving circuit 50 for printing. The driving circuit 50 derives the three color composite image signals sequentially by color to display composite monochromatic images on the screen of the CRT 17 one by one.

For this CRT 17, there is used a black-and-white CRT so as to thereby display on its screen a black-and-white image in the form of a brightness pattern for every monochromatic composite image. A color photographic or printing paper 20 is exposed to the black-and-white image on the screen of the black-and-white CRT through a lens 19 when shutter means 18 is opened. During this exposure, three primary color filters 7, 8, 9 are selectively sequentially inserted between the lens 19 and shutter means 18 under the control of a filter changeover device 51 so as to create a monochromatic composite image to which the color printing paper 20 is exposed in sequence. In this way the color printing paper 20 is exposed to the three different monochromatic composite images, namely blue, green and red images, in this order. The shutter 18 is controlled by a driving device 52 in such a way as to be closed during the change-over of the filters 7 to 9 and the advancement of the color printing paper 20. It is desirable to use as the color printing paper 20 a thin color paper of 100 to 150 $\mu$ thickness for preventing a card to be made from that color printing paper 20 from warping.

The control circuit 53 controls the operations of the image composing section 12, the data entry in the logarithmic transforming circuits 41a to 41c and the look-up tables 47a to 47c, the writing of calculation formulas in the color correction circuit 42, and the reading-out of the data from the frame memories 43a to 43b and the writing of additional data therein.

Figure 4:
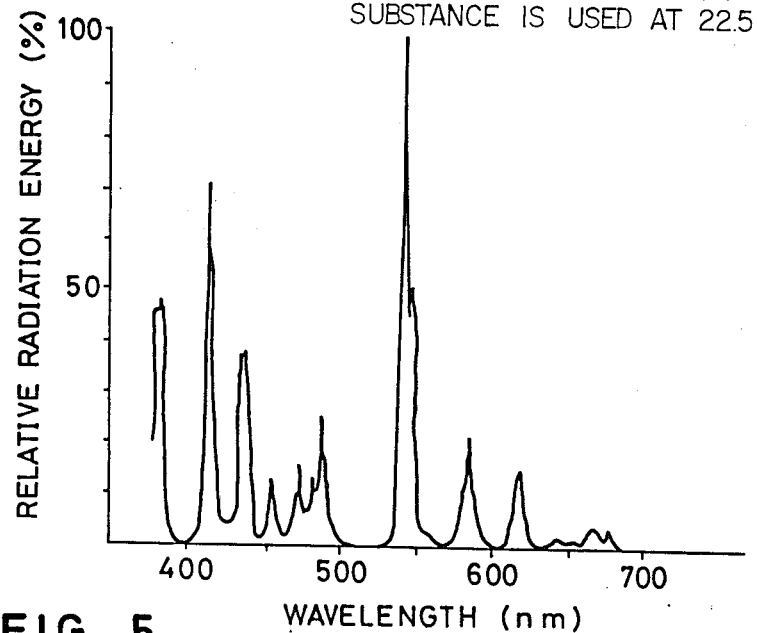
FIG. 4 is a graph showing the spectral luminance characteristic of a conventional black-and-white CRT wherein P45 fluorescent substance is used.

Usual black-and-white CRTs contain a fluorescent substance P45 in E I A system which is composed of $Y_2O_2S$ and Tb. The fluorescent substance P45, as shown in FIG. 4, has a spectral luminance characteristic having a maximum radiation peak at about 540 nm and which is mostly comprised of wavelengths shorter than about 600 nm.

Figure 5:
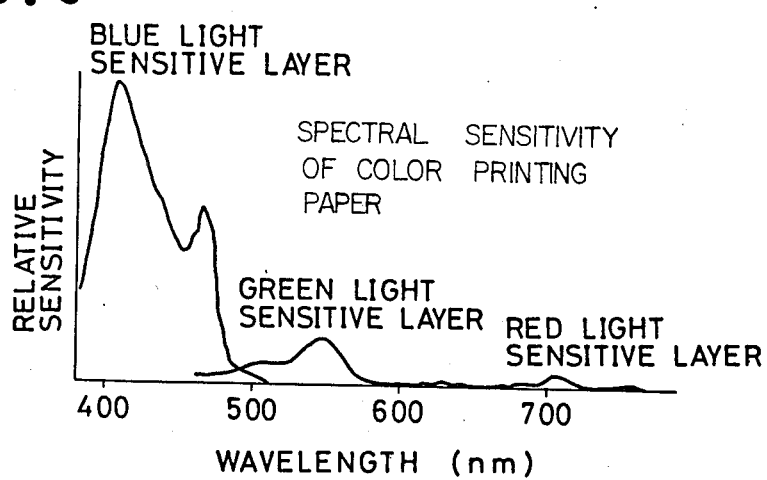
FIG. 5 is a graph showing the spectral sensitivity of a color printing paper.

On the other hand, usual color printing papers have a spectral sensitivity distribution as shown in FIG. 5 wherein the red light-sensitive layer is considerably lower in sensitivity than the blue light-sensitive layer. For example, the density value is 1.2 for the blue light-sensitive layer, 0.17 for the green light-sensitive layer and 0.023 for the red light-sensitive layer when exposing a color printing paper to a white light. For this reason, it is necessary to expose the color printing paper to a red image on the black-and-white CRT for hundreds of seconds.

Figure 6:
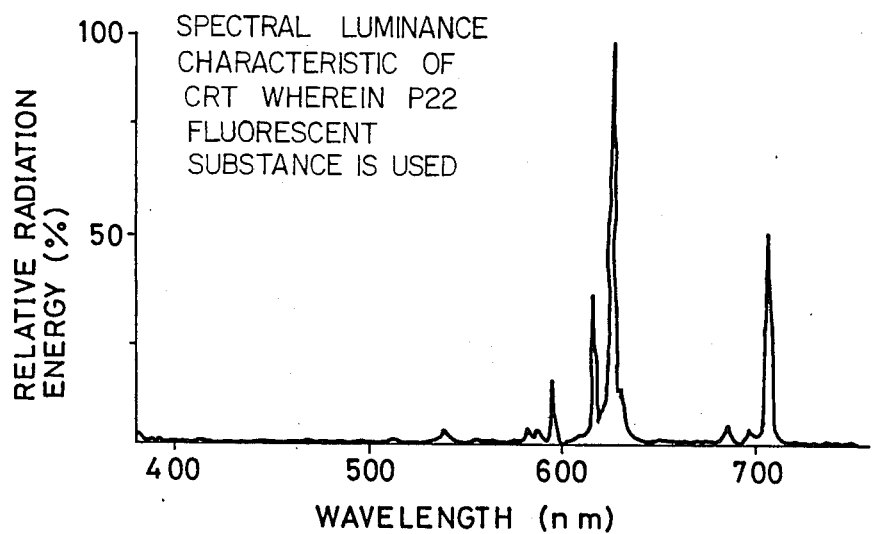
FIG. 6 is a graph showing the spectral luminance characteristic of the black-and-white CRT wherein P22 fluorescent substance is used.
Figure 7:
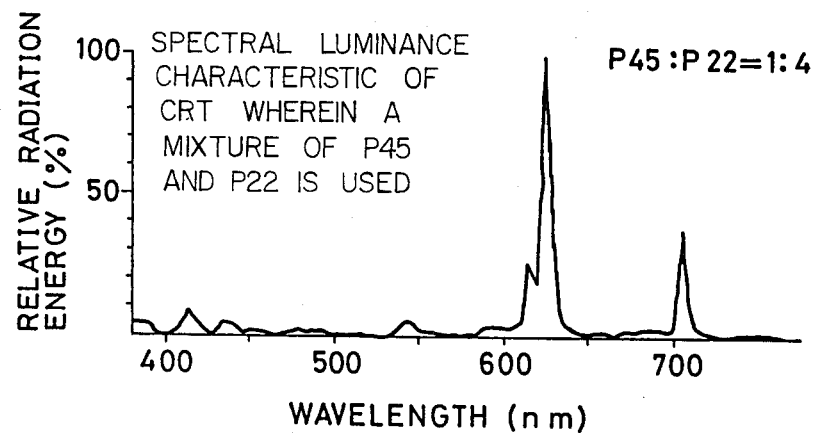
FIG. 7 is a graph showing the spectral luminance characteristic of a black-and-white CRT which uses a mixture of fluorescent substances of P45 and P22, in the ratio of 1:4.

In view of the elimination of such a long exposure to a red image, the black-and-white CRT 17 used in this embodiment is adapted to have a high luminance characteristic for reducing the exposure time of the color printing paper. It should be noted that the screen of the black-and-white CRT contains a mixture of fluorescent substances of P45 and P22 (whose spectral luminance characteristics are shown in FIG. 6), in the ratio between 1:3 and 1:5, preferably in the ratio of 1:4. The black-and-white CRT 17 which uses a mixture of fluorescent substances P45 and P22 in the ratio of 1:4 exhibits its spectral luminance characteristics shown in FIG. 7 wherein peak energy is emitted at 620 nm for the maximum and 710 nm for the second highest. As can be clearly understood from FIG. 7, the above-described black-and-white CRT 17 exhibits fluorescent luminance which is high in the wavelength range of red and low in the wavelength range of blue. As a result, although the color printing paper 20 has a low spectral sensitivity to red and relatively high spectral sensitivity to blue, the exposure time for red is considerably reduced to about one second, which is almost equal to that of blue, resulting in well color-balanced prints.

Figure 8:
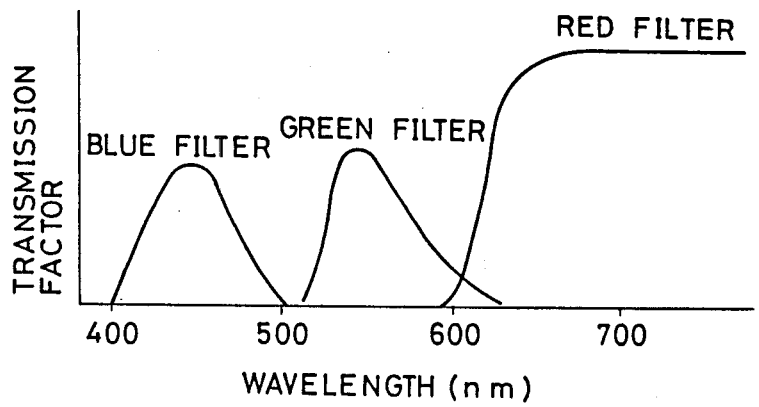
FIG. 8 is a graph showing the transmittance factors of the various color filters.

The color printing paper 20 is exposed for about one second to each of black-and-white images which are sequentially displayed in a brightness distribution corresponding to the respective monochromatic composite images on the screen of the black-and-white CRT 17. As previously described, these exposures are made through the corresponding color filters 7 to 9 whose light transmission factors are shown in FIG. 8. In place of the color filters 7 to 9 separately provided, it is permissible to provide a rotatable disk holding three color filters arranged circularly therein in such a way as to position these filters in the optical path of the lens 19 in sequence.

A further understanding of the method of making employee identification cards by the CRT image printing apparatus to which the method of the present invention is applied will be had from the following description referring to FIGS. 9 through 12.

For preparing a composite image by the image composing section 12, the image to be reproduced on an employee identification card has first to be taken by a still camera on a negative film 10.

The color TV camera 11 picks up the image 10a on the negative film 10 of the upper half of a person who has at his or her chest a data plate 10b on which his or her name and/or employee number is shown and sends the information of the image to the image composing section 12 through the connector 37. This image taking is executed for a number of employees, whose upper half of the figure images have been recorded on a negative film 10, in order to receipt number, while the correspondence between the name and employee number of each person is verified.

On the other hand, an operator prepares the necessary personal data for describing or identifying each person such as the name, the date of birth, the employee number and so forth with the aid of the keyboard and stores the information in the floppy disk, while the data are displayed in a predetermined format on the color monitor 16. The preparation of the necessary personal data is executed for a number of employees at a time in order of employee number. The operator also prepares the computer graphic design such as a company mark with the aid of a digitizer and stores the information in the floppy disk.

Figure 9:
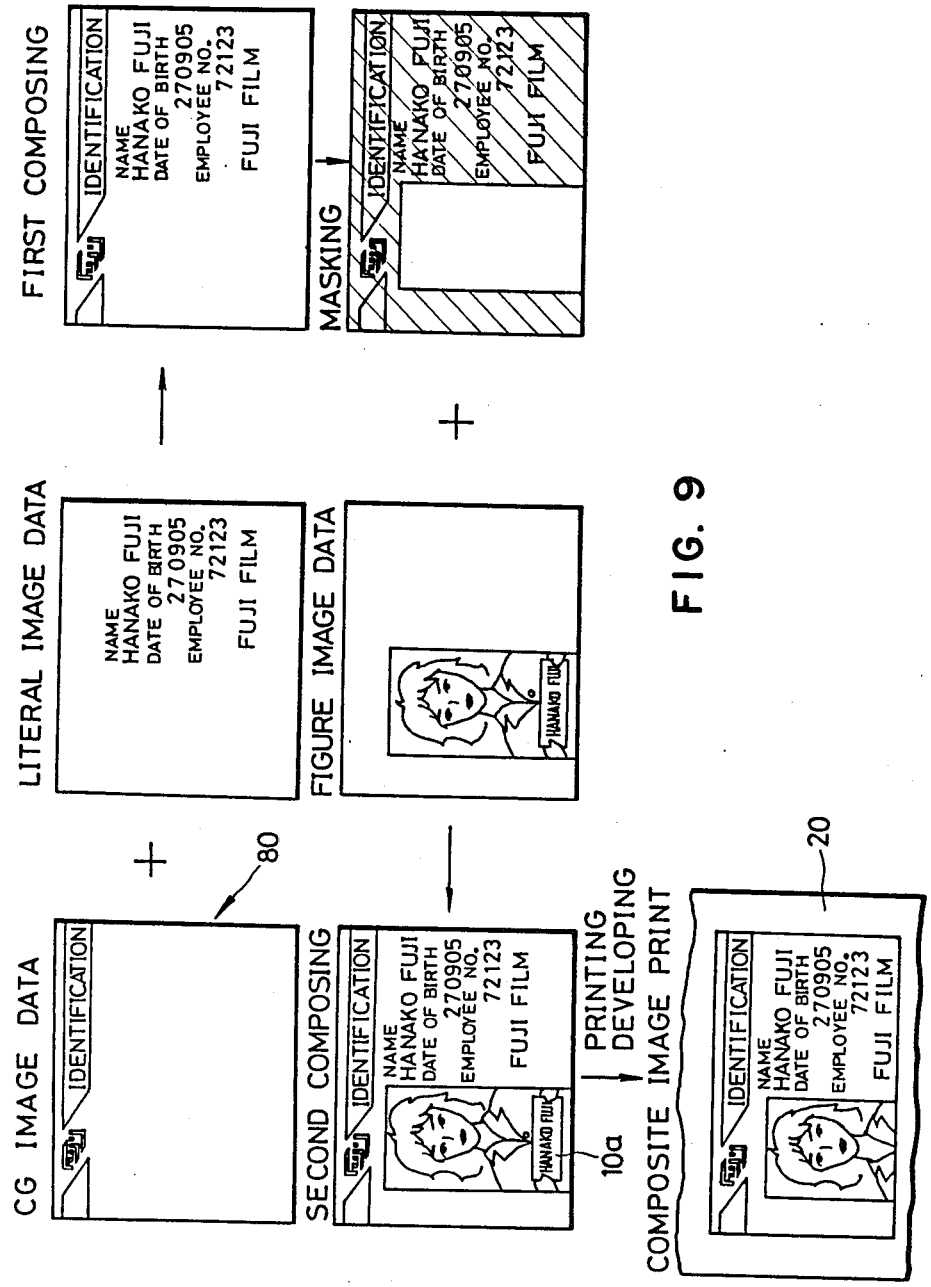
FIG. 9 is an explanatory illustration showing the sequence of making a CRT composite image print sheet.

For editing a composite image on the color monitor 16, the image of the computer graphic design is first arrayed at an upper portion of an identification sheet 80 as shown in FIG. 9. For this purpose, the information concerning the computer graphic design is retrieved from the floppy disk with the aid of the keyboard. At this time, since the information is stored in the floppy disk as separate color signals, the respective color signals are read out by color to be written in the frame memories 43a to 43c provided for each color. In order to display the information as a color positive image on the color monitor 16, the control circuit 53 causes each look-up table 47a to 47c to select a positive transforming mode.

Next, the operator prepares the personal data of the person whose identification card is now being made by entering his or her employee number via the keyboard. His or her personal data are retrieved as well as the data of its positional arrangement from the floppy disk, color-by-color, and are added, after being transformed to the data of picture elements, to the data of the computer graphic design, again color-by-color, in the adding circuit 46. As a result, each frame memory 43a to 43c is rewritten with the resulting data so as to display the personal data and the computer graphic design as a color composite image on the color monitor 16, while an area on the left hand side of the identification sheet 80 allotted for insertion of the figure image is left blank on the color monitor 16.

Finally, the operator provides the upper half figure image of the person whose identification card is being made by starting the TV camera 11, which transmits video signals of an upper half figure image in the form of three color video signals, namely blue (B), green (G) and red (R). Each color video signal of an upper half figure image is processed by the respective composing circuit in the composing section 12 as was previously described in connection with FIG. 3; however, in the adding circuit 46, the data for each upper half figure image are, after color correction, added to the previously stored data in each frame memory, while masking an area of the identification sheet 80 excepting the area for insertion of the upper half figure image. With the resulting data for each color, each frame memory 43a to 43c is rewritten. As a result, an upper half figure image is displayed in color on the color monitor 16. It is to be noted in this embodiment that each frame memory 43a to 43c comprises 512×512 picture elements each being allotted eight bits to express gradation.

On the monitor 16 there is displayed an upper half figure image 10a including the data place 10b, in the allotted area, while the images of the computer graphic design and the personal data are kept unchanged. At the time of each display, the operator inspects the images to determine whether the name or employee number in the upper half figure image coincides with the name or employee number in the personal data. When these coincide, the operator, after confirming that the composite image is good in color balance and gradation, enters an instruction to print, via the keyboard. However, if there is no coincidence, the upper half figure image is replaced with others, one by one, keeping the images of the personal data and the computer graphic design until the name or employee number and the personal data and the upper half figure image match each other.

When the instruction to print is entered, the control circuit 53 causes each look-up table 47a to 47c to select a negative transforming mode and simultaneously causes the switching circuit 49 to transmit the respective color video signals R, G, B from the image composing section 12 to the CRT driving circuit 50 so as to display black-and-white images on the screen of the black-and-white CRT 17.

To describe this more fully, the image display and printing is effected as follows:

Because the look-up table 47a to 47c are in the negative transforming mode, data that are transmitted to the CRT driving circuit 50 are of the reversed image of each monochromatic composite image. The CRT driving circuit 50 is adapted to cause the black-and-white CRT 17 to scan on its screen in the direction opposite to the normal scanning direction, namely from right to left, thereby to display the mirror image of each composite image. When the blue composite image is displayed as a black-and-white image on the screen of the black-and-white CRT 17, the blue filter 7 is selected and positioned in the optical path of the lens 19. At this time, the shutter 18 opened for a period of time which is predetermined in accordance with the sensitivity of the color printing paper 20 to blue light so as to make a proper exposure. Although the upper half figure image is displayed over almost all of the screen of the black-and-white CRT 17, an exposure aperture mask disposed in front of the color printing paper overlaps the projected image so as to hide the lower half thereof including the data plate 10b, whereby no image of the data plate 10b is printed on the color printing paper 20. After the exposure of the blue composite image, the green filter 8 is positioned in the optical path just after the blue filter 7 has left, simultaneously with the display of the green composite image as a black-and-white image on the screen of the black-and-white CRT 17. In the same manner as for the blue composite image, the color printing paper 20 is exposed to the green and red images in sequence. When the exposure of the color printing paper 20 in the three-color frame sequence exposure system is completed, the color printing paper 20 is advanced by one frame for positioning an unexposed part thereof over the exposure mask.

The above-described operations are repeated as many times as required. When a predetermined number of exposures are effected, the color printing paper 20 is automatically cut off after the last frame, and the exposed color printing paper 20 is processed by being passed automatically through the photo processing apparatus 21. The color printing paper 20 thus processed is cut off frame-by-frame by the cutters 22a, 22b to provide separate identification sheets 80 with individual different composite images.

Figure 10:
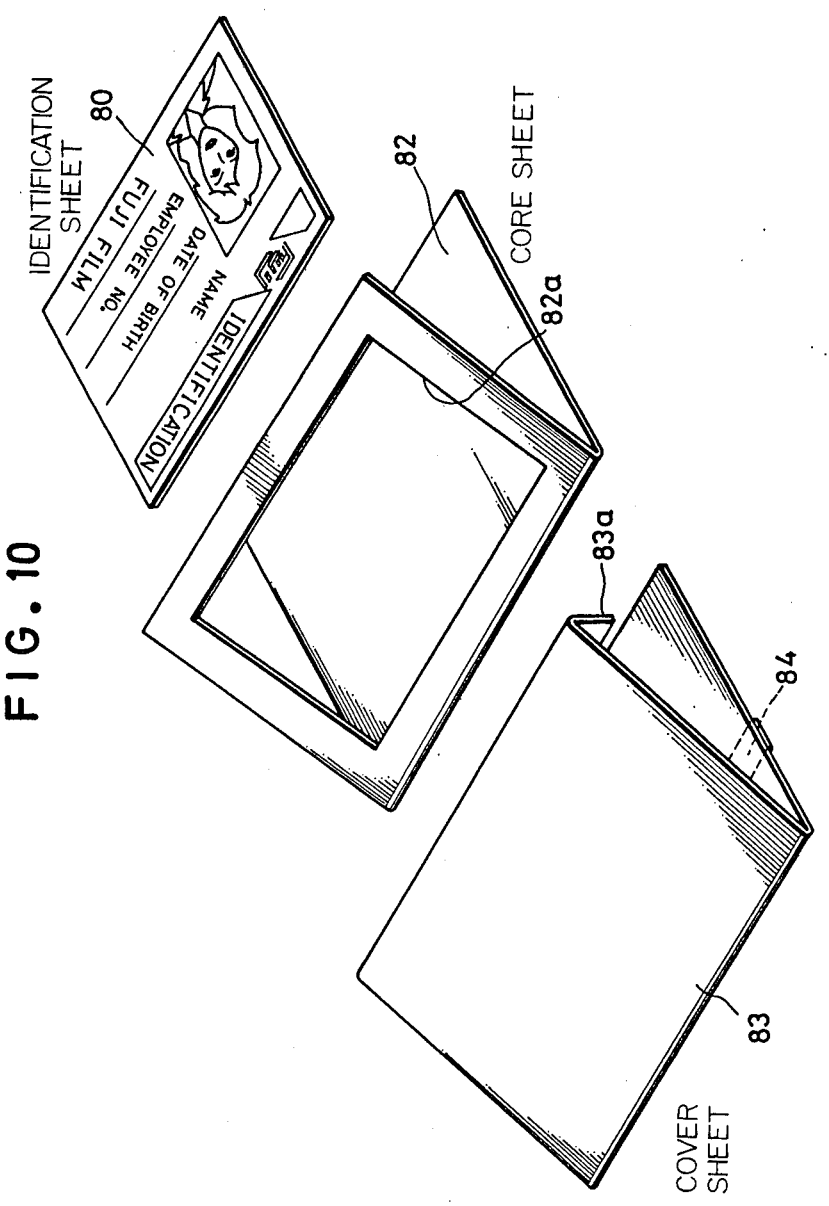
FIG. 10 is an exploded perspective view of an identification card.
Figure 11:
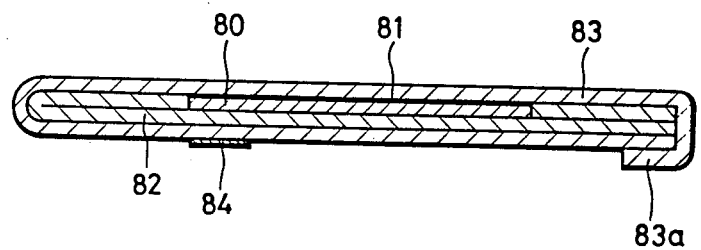
FIG. 11 is a cross sectional view of the identification card of FIG. 10 wherein component sheets are pressure-welded with heat.
Figure 12:
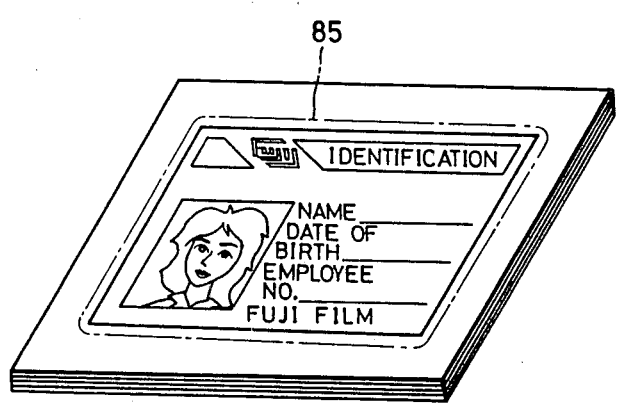
FIG. 12 is a perspective view of the identification card before being punched out.

The identification sheet 80 is, as shown in FIG. 10, mounted in a frame 82a of a core sheet 82 folded in two, after the application of a heat-weldable bonding agent 81 over all the printed surface (see FIG. 11). For this core sheet 82, it is preferable to use a sheet of a plastic such as a white polyvinyl chloride resin. The folded core sheet 82 with the identification print sheet 80 mounted therein is inserted between the leaves of a colorless, transparent two-fold cover sheet 83 which is preferably made of, for example, a polyvinyl chloride which is pressure-weldable to the core sheet 82 with heat. On the back of the cover sheet 83 there is a magnetic strip 84 attached thereto. Designated by numeral 83a is a flap for preventing the inserted core sheet 82 from slipping out.

The sheet assembly comprising the identification print sheet 80, the two-fold core sheet 82 and the two-fold cover sheet 83 is pressed and heated so as to heat-weld its components to each other. At this time, the printed surface of the identification sheet 80 is heat-welded to the front half of the cover sheet 83 through the heat-weldable bonding agent 81 previously applied to the identification sheet 80 on the printed surface thereof. The sheet assembly thus heat-welded is stamped out using a press die of a shape shown by a dotted chain line 85 in FIG. 12 to provide a complete identification card. In this embodiment, because of the heat-welded bonding agent 81, the identification print sheet 80 is firmly attached to the cover sheet 83, whereby not only is no air or liquid able to penetrate even under hard scrubbing, but also the replacement of the figure picture and/or the personal data, i.e. forgery, is prevented.

Of course, black-and-white printing paper can be used for making a print of a black-and-white picture.

In place of the above-described frame sequence exposure system, a line sequence exposure system may be used. In this case, a CRT having a flat screen should be used and the printing paper is intermittently moved for line exposure. If a CRT having a screen which can display three color-scanning lines at a time is used, high speed printing can be realized.

While the invention has been disclosed in connection with a preferred embodiment thereof, it will be recognized by those skilled in the art that various modifications of the invention are possible within the spirit and scope of the following claims.

What is claimed is:

1. A method of making a colored print from an image on a black-and-white CRT display device, which comprises the steps of:
preparing a number of colored figure images on a photosensitive material which can be preserved;
reading one of said colored figure images in the form of a video signal by means of an image reading device;
preparing personal data as video signals corresponding to one of said colored figure images to be read;
providing composite video signals of said figure image and personal data so as to display said composite video signals as a visible composite image on said CRT display device by displaying on said CRT display device a sequence of black-and-white images through respective blue, green and red filters;
imparting to said CRT display device a substantially greater fluorescent luminance in the wavelength range of red than in the wavelength range of blue; and printing said visible composite image from said CRT display device on a printing paper, thereby providing a print of said composite image.

2. A method as claimed in claim 1, in which said photosensitive material is a negative film.

3. A method as claimed in claim 1, in which said image reading device is a TV camera.

4. A method as claimed in claim 1, in which said black-and-white CRT display device has a luminescent screen comprising a mixture of P45 and P22 fluorescent substances in a ratio between 1:3 and 1:5.

* * * * *